Figures 1, 1A:
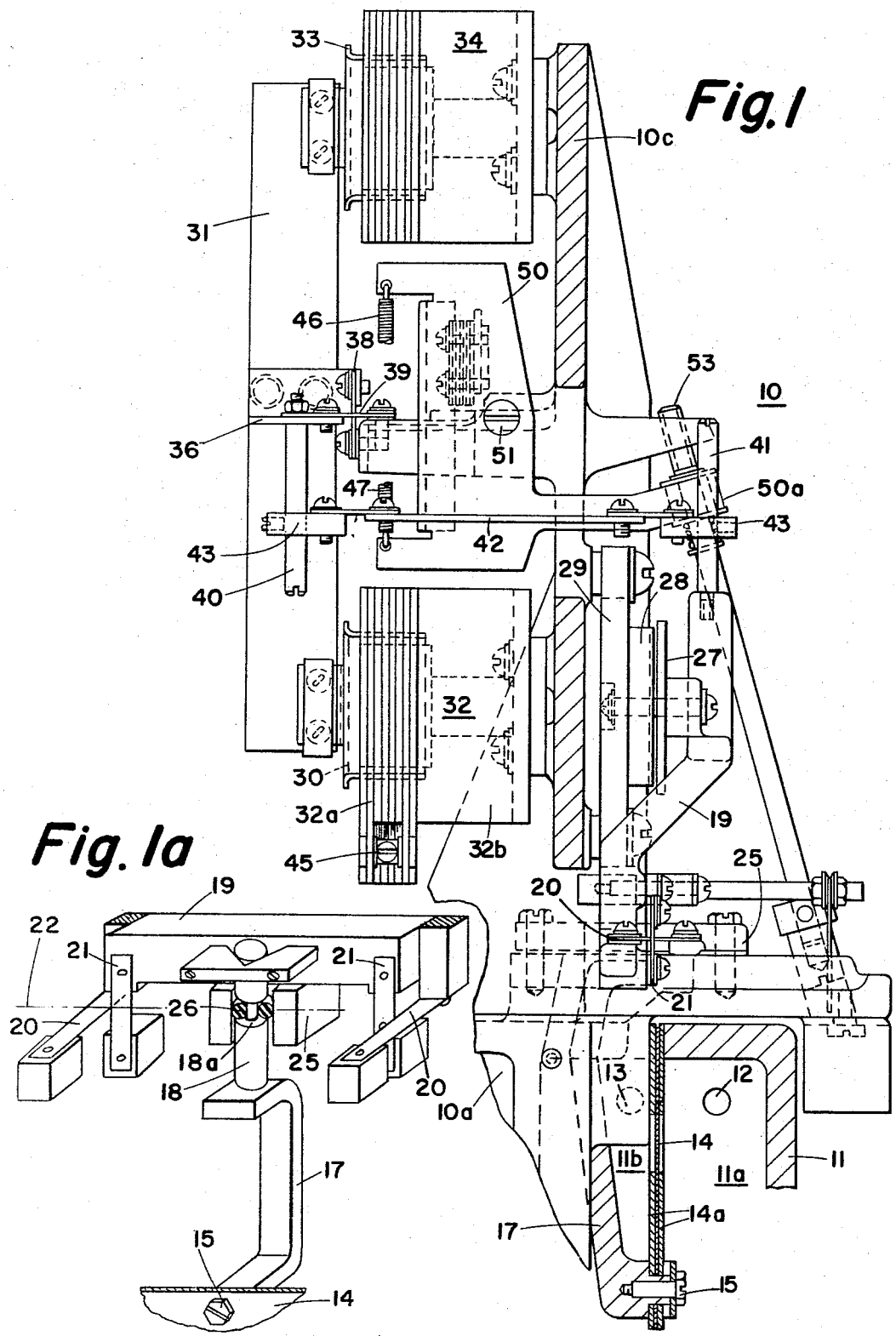

United States Patent Office 3,315,528
Patented Apr. 25, 1967

3,315,528
FORCE BALANCE LEVER TRANSMISSION WITH SHAFT SEAL
Richard M. Hickox, Glenside, Pa., assignor to Leeds & Northrup Company, a corporation of Pennsylvania
Filed Feb. 23, 1965, Ser. No. 434,566
5 Claims. (Cl. 73—407)

This invention relates to pressure responsive measuring instruments of the force balance type and has for an object the provision of an improved torque transmission and shaft seal therefor.

In a low pressure, diffferential pressure and flow transmitter, the working pressure heretofore has been contained by a metal sealing diaphragm. The area of such diaphragm has limited the allowable working pressure to about 50 p.s.i. and the mismatch of the effective center of the diaphragm and the center of the pivoted lever passing therethrough multiplied by the working pressure and the area of the diaphragm give a large error torque. The present invention has overcome the foregoing limitations of the metal sealing diaphragm by transmitting torque through a minimum diameter pressure seal on an externally supported shaft.

In accordance with the present invention, there is provided in a pressure responsive measuring instrument of the torque transmitting type, a hollow housing and a flexible diaphragm disposed in the housing and dividing the housing into a pair of separate chambers. A lever extends into the housing and is connected at one end to the diaphragm. A pair of low friction pivot means are spaced along a common axis on opposite sides of the lever and provide a pivot therefor exterior of the housing. There is also provided sealing means connecting the lever and the housing to prevent flow of fluid around the lever while avoiding the introduction of an error torque in the instrument. The sealing means comprises an O-ring of elastomer material surrounding the pivoted lever and forming a seal on its inner circumference with the lever and on its outer circumference with the housing, the center line of the O-ring being common to the common axis of the pivot means.

More specifically, and in accordance with one aspect of the invention, the pair of low friction pivot means comprises a pair of crossed, flat spring means connected to the lever on opposite sides thereof and to the exterior of the housing, both of the crossed, flat spring means having their center lines on a common axis to provide a pivot for the lever. The lever is provided with an annular groove intermediate its ends to receive an O-ring of elastomer material or equivalent. The O-ring forms a seal on its inner circumference with the annular groove in the lever and on its outer circumference with a sealing plate supported by the housing, the center line of the O-ring being common to the center lines and the common axis of the crossed spring pivots.

For further objects and advantages of the invention and for a more detailed description thereof, reference is to be had to the following specification taken in conjunction with the accompanying drawings in which:

FIG. 1 is a schematic view partly in section of a differential pressure transmitter utilizing the shaft seal for torque transmission of the present invention; and FIG. 1a is a perspective view of the arrangement for transmitting torque through a pressure seal on an externally supported shaft as utilized in FIG. 1.

Referring to FIG. 1, the invention has been illustrated in connection with a differential pressure transmitter of the force balance type which is adapted to convert a differential pressure to an electric current. The force balance transmitter 10 includes a differential pressure cell or housing 11 which has a pair of inlet ports 12 and 13 to which high and low pressure connections are made. The inlet ports 13 and 12 are supplied with pressure from the low pressure and high pressure sides, for example, of an orifice plate in a flow line. It will be noted that the inlet ports 12 and 13 are disposed on opposite sides of a flexible diaphragm 14, the edges of which are clamped between mating parts of the housing 11. The center portion of the flexible diaphragm 14 is provided on both of its surfaces with rigid plate members 14a through which extend a clamp screw 15. The flexible diaphragm 14 divides the housing 11 into two separate chambers 11a and 11b with the flexible diaphragm 14 providing a common wall between the two chambers 11a and 11b.

The diaphragm 14 is connected, by clamp screw 15, to one end of an arm 17 and the other end of arm 17 is secured to one end of a shaft 18, FIG. 1a. The shaft 18 extends out of the interior of housing 11 and has its opposite end secured to a beam member 19. As may be seen in FIGS. 1 and 1a, the beam member 19 is connected to a pair of flat pivot spring members 20 disposed on opposite sides of the shaft 18 and a pair of vertical flat pivot spring members 21, also disposed on opposite sides of the shaft 18. The cooperating pairs of flat pivot springs 20 and 21 cross each other at right angles thereto and their center lines, through their points of intersection, lie on a common center line which defines a common pivotal axis 22. The opposite ends of the flat pivot springs 20 and 21 are secured to stationary parts of the frame for the transmitter 10. Thus, it will be seen that the beam member 19 and the arm 17 are rigidly secured to each other by means of the intermediate shaft 18 and all three members 17–19 constitute a lever which is adapted to pivot about the pivotal axis 22.

As previously mentioned, the shaft 18 extends out of the housing 11. In order to maintain the pressure within the diaphragm chamber 11b, a sealing block or plate 25 is secured to the housing 11 and over the opening therein through which the shaft 18 extends. The shaft 18 extends through an opening in the sealing plate 25. The shaft 18 is provided with an annular sealing ring 26 of the O-ring type, or equivalent, which may be made of an elastomer material including rubber or other suitable equivalent plastic material such as nylon, fluorocarbon resin and the like. The O-ring 26 forms a seal on its inner circumference with the shaft 18 and on its outer circumference with the opening through the sealing plate 25. As may be seen in FIG. 1a, the shaft 18 is provided with an annular groove 18a which receives the annular sealing O-ring 26. The groove 18a is so positioned as to maintain the center of O-ring 26 on the common center line or axis 22 of the pivots 20 and 21.

The beam 19 is provided with a movable capacitor plate 27 which is adapted to cooperate with a stationary capacitor plate 28 supported from one side of insulator member 29. The capacitor plate 27 is moved relative to the stationary capacitor plate 28 in response to changes in the differential pressure applied to the opposite sides of the diaphragm 14. The change in the spacing between the capacitor plates 27 and 28 produces a change in capacitance in an oscillator circuit (not shown) located within the housing portion 10a, FIG. 1. The details of the electrical circuit do not form part of the present invention and, thus, are not specifically disclosed. However, the electrical circuit may be similar to the oscillator-amplifier circuit disclosed in United States Patent 2,957,115—Clark et al., with the exception that the present circuit incorporates a variable capacitor rather than a variable inductor.

The D.C. output current from the amplifier contained in the housing portion 10a is fed by way of electrical conductors (not shown) to a feedback coil 30 which is suspended at one end of a pivoted beam 31 in the field of a permanent magnet 32 supported on frame member 10c. Since the output current flowing in coil 30 is flowing in the field of magnet 32, it is acted upon by a motor force proportional to the current which tends to force the coil 30 out of the gap of magnet 32. The opposite end of the beam 31 is provided with a damping coil 33 which is suspended in the field of a permanent magnet 34, also supported by the frame member 10c. The beam 31 comprises a pair of spaced members which are connected, intermediate their ends, by means of a U-shaped bracket 36. The bracket 36 is supported from the frame 10c by two pairs of spaced, crossed, flat pivot springs 38 and 39 which are similar to the pivot springs 20 and 21 previously described. Thus, the crossed pivot springs 38 and 39 provide a flexible pivot bearing for the beam 31. Depending from the mid-portion of the U-shaped member 36 is a stud 40 which is similar to the stud 41 extending from the end of the beam 19. The studs 40 and 41 are connected, by means of a flexible link 42 which transmits the torque produced by the motor force in coil 30 from beam 31 to beam 19 and restores the movable capacitor plate 27 on beam 19 substantially to its original position. The link 42 is provided, at its opposite ends, with connectors 43, respectively adjustable along the studs 40 and 41 to provide a rough or coarse range or span adjustment by varying the ratio of the lever arms on the two beams 19 and 31. The fine range adjustment may be accomplished electrically by an adjustable resistance shunting the coil 30 or by adjusting the magnetic air gap relative to feedback coil 30 by means of a screw member 45 associated with the pole shoe 32a on the permanent magnet 32, the latter system of adjustment being disclosed and claimed in copending application, Ser No. 434,567, filed concurrently herewith by Cranch and Hickox. The beam 31 is urged to a zero position by means of a pair of coil springs 46 and 47 which are connected, at one end, to a member extending from the bracket 36 carried by the beam 31 and, at their opposite ends, to a bracket 50 carried by a pivot 51 extending into the frame 10c. The bracket 50 is provided with an arm 50a which is adapted to be connected to an adjustable shaft 53, the lower end of which is accessible from the exterior of the housing for the transmitter 10. By rotating the shaft 53, which is threaded, the bracket 50 may be rotated about its pivot 51 causing the springs 46 and 47 to vary the force applied to the connection to the beam 31 thereby adjusting the zero position of the capacitor plate 27 by moving beam 19 by means of link 42. Plate 27 is in the zero position when the output current is zero.

From the foregoing description, it will now be apparent that the transmitter 10 comprises a force balance system. As will be understood by those skilled in the art, a system of this type always requires a very small amount of offset in order to provide the feedback current to adjust the force balance. However, due to the high degree of amplification, the resultant displacement between the capacitor plates 27 and 28 is very small. In order to avoid a dead band in the transmitter, it is exceedingly important that the friction on the beam 31 be held to the absolute minimum. It is also important that the pivot structure and seal at the pivotal axis for the beam 19 be of such construction so as not to produce an error torque of any substantial amount. In prior arrangements, the working pressure was contained in the diaphragm housing by a metal sealing diaphragm. The area of such diaphragm limited the allowable working pressure to a relatively low value, for example, in the order of 50 p.s.i. and the mismatch of its effective center and the center of the beam, multiplied by the working pressure, multiplied by the area of the diaphragm gave a large error torque in the instrument.

To overcome the limitations of the metal sealing diaphragm, the seal area in the present invention has been reduced to a minimum by using the annular rubber O-ring 26 or equivalent, FIG. 1a, for the seal. The support for the beam 19, against forces which would otherwise compress the annular rubber O-ring 26, is provided by the cross spring pivots 20 and 21 located on the same center line as the annular rubber O-ring 26. The seal is rated to withstand relatively high pressures in the order of 1500 p.s.i., but other portions of the pressure housing 11, of course, require operation at much lower working pressures. Since the beam 19 of the force balance transmitter moves through very small angles, in the order of about ten minutes of an angle maximum, and since the O-ring 26 is at the center of rotation, the O-ring 26 does not slip and contribute a friction error and the amount of strain of the ring is so small that the hysteresis is negligible. In a force balance transmitter constructed in accordance with the present invention, the maximum hysteresis was about .14 percent.

While the present invention has been described in connection with a force balance differential pressure transmitter in which the feedback force is obtained from a current-conducting coil 30 in a permanent magnet field, it is to be understood that the invention is also applicable to a force balance flow transmitter in which the magnetic field is provided by the current in a field coil or electromagnet in place of the permanent magnet 32. Such a force balance flow transmitter is disclosed in copending application, Ser. No. 434,457, filed concurrently herewith by Cranch and Stanwood.

For the purposes of this specification and the claims, the term "elastomer material" used herein is intended to be used in a generic sense and includes rubber and synthetic rubber materials as well as suitable equivalent plastic materials such as nylon, fluorocarbon resin and other materials having similar resilient sealing properties.

It is further to be understood that the term "O-ring" is used herein in a generic sense and is intended to include equivalent annular rings wherein the configuration of the cross section of the ring is such as not to interfere with the pivotal movement of the shaft.

It shall be understood that this invention is not limited to the specific arrangements shown and that changes and modifications may be made within the scope of the appended claims.

What is claimed is:

1. In a pressure responsive measuring instrument of the force balance type, a hollow housing, a flexible diaphragm disposed in said housing,
   a lever extending into said housing and connected at one end to said diaphragm,
   low friction pivot means supporting said lever and providing a pivot therefor exterior of said housing, and
   sealing means connecting said lever and said housing to prevent flow of fluid around said lever while avoiding the introduction of an error torque in the instrument, said sealing means comprising an O-ring of elastomer material surrounding said pivoted lever and forming a seal on its inner circumference with said lever and on its outer circumference with said housing, the center line of said O-ring being common to the axis of said pivot means.

2. In a pressure responsive measuring instrument according to claim 1 wherein said lever includes an intermediate section of reduced diameter, an annular groove formed in said intermediate section and adapted to receive said O-ring, said O-ring forming a seal on its inner circumference with said annular groove and on its outer circumference with said housing, said annular groove maintaining said O-ring in position axially of said lever so that the center line of said O-ring is maintained common to the axis of said pivot means.

3. In a pressure responsive measuring instrument of the torque transmitting type, a hollow housing, a flexible diaphragm disposed in said housing and dividing said housing into a pair of separate chambers, a sealing plate supported by said housing, a lever extending through said sealing plate into said housing and connected at one end to said diaphragm, a pair of crossed flat spring means connected to said lever on opposite sides therefor and to the exterior of said housing, both of said crossed spring means having their center lines on a common axis to provide a pivot for said lever, and sealing means connecting said lever and said housing to prevent flow of fluid around said lever while avoiding the introduction of an error torque in the instrument, said sealing means comprising an O-ring of elastomer material surrounding said lever intermediate the ends thereof, said O-ring forming a seal on its inner circumference with said lever and on its outer circumference with said sealing plate, the center line of said O-ring being common to the center lines and to the common axis of said pivot.

4. In a pressure responsive measuring instrument according to claim 3 wherein the intermediate portion of said lever is provided with an annular groove and said O-ring is positioned in said groove, the inner circumference of said O-ring forming a seal with said annular groove and the outer circumference of said O-ring forming a seal with said sealing plate.

5. In a pressure responsive measuring instrument according to claim 3 wherein said lever comprises a pair of end sections joined together by an intermediate shaft section, said shaft section including an annular groove for receiving said O-ring and maintaining the center line of said O-ring on the common axis of the pivot formed by said crossed spring means while preventing flow of fluid around said lever and sealing said housing.

References Cited by the Examiner

UNITED STATES PATENTS

| | | | |
|---|---|---|---|
| 2,431,200 | 11/1947 | Rosenberger | 74—18.1 |
| 2,690,360 | 9/1954 | Young | 308—36.1 |
| 2,757,053 | 7/1956 | Green | 308—187.1 |
| 2,779,197 | 1/1957 | Embree | 74—17.8 X |
| 2,995,041 | 8/1961 | Rowan | 74—18 |
| 3,274,833 | 9/1966 | Ollivier et al. | 73—407 |

LOUIS R. PRINCE, *Primary Examiner.*

D. O. WOODIEL, *Assistant Examiner.*